United States Patent [19]
Van De Walle et al.

[11] Patent Number: 5,670,872
[45] Date of Patent: Sep. 23, 1997

[54] SYSTEM AND DEVICE WITH VERTICAL AND ROTARY WHEEL-VELOCITY-MEASURING FOR DETERMINING VEHICLE DISPLACEMENT

[75] Inventors: Gerjan F. A. Van De Walle; Franciscus P. Widdershoven, both of Eindhoven, Netherlands

[73] Assignee: U.S. Philips Corporation, New York, N.Y.

[21] Appl. No.: 62,373

[22] Filed: May 14, 1993

[30] Foreign Application Priority Data

Jun. 22, 1992 [EP] European Pat. Off. ............. 92201817

[51] Int. Cl.$^6$ ............... E01B 1/00; G01P 3/64; G01P 15/00; G01C 22/00
[52] U.S. Cl. .................... 324/171; 364/565; 324/160
[58] Field of Search .......................... 324/160, 171, 324/207.23, 207.12, 225; 340/992; 364/561, 565

[56] References Cited

U.S. PATENT DOCUMENTS 4,862,486  8/1989  Wing et al. .
4,922,444  5/1990  Baba ............................... 364/449
5,301,130  4/1994  Alcone et al. .................... 324/160

FOREIGN PATENT DOCUMENTS 0337797  10/1989  European Pat. Off. .
2751012   5/1979  Germany .
2922413  12/1980  Germany .
63-231211 9/1988  Japan .

*Primary Examiner*—Walter E. Snow
*Attorney, Agent, or Firm*—Robert J. Kraus

[57] ABSTRACT

A device for determining the displacement of a vehicle on wheels which are connected to a body via a wheel suspension. The device includes apparatus for measuring a quantity which is indicative of the instantaneous vertical velocity of a wheel relative to the body. Using this quantity, the vertical component of the wheel displacement is eliminated so that in the event of a bumpy road surface a higher accuracy is obtained for determining the displacement of the vehicle body.

17 Claims, 1 Drawing Sheet

SYSTEM AND DEVICE WITH VERTICAL AND ROTARY WHEEL-VELOCITY-MEASURING FOR DETERMINING VEHICLE DISPLACEMENT

FIELD OF THE INVENTION

Background of the Invention

This invention relates to a device for determining the displacement of a vehicle on wheels which are connected to a body of the vehicle by wheel suspension means, which device comprises at least one sensor for measuring a first quantity which is indicative of the rotary velocity of a wheel of the vehicle, and means for processing the first quantity so as to determine the displacement. The invention also relates to a navigation system for a vehicle, which system comprises such a device, and also to a vehicle comprising such a device, and/or navigation system.

A device of the kind set forth is known from U.S. Pat. No. 4,862,486. The cited patent describes a device which determines the number of revolutions of a wheel of a vehicle per unit of time, and therefore, the actual speed, by means of a sensor which is mounted on the inner side of a tire and which is responsive to deformation of the part of the tire on which the sensor is mounted. The displacement of the vehicle can be approximated by measurement of the number of revolutions of a wheel, provided that the rolling or outer radius of the wheel is known.

It is a drawback of such a device that the determination of the displacement of the vehicle is inaccurate because the displacement determined from the number of revolutions of the wheel is in fact the displacement of a reference point on the outer circumference of the wheel. However, this displacement is not always equal to the actual vehicle displacement. In the case of a bumpy road surface, the apparent displacement of the reference point on the outer circumference of the wheel will be greater than the displacement of the vehicle body, which does not exactly follow the bumps in the road surface due to the damping effect of the wheel suspension. Irregularities in the road surface thus introduce a systematic error in the determination of the displacement of the vehicle.

SUMMARY OF THE INVENTION

Accordingly, amongst other things it is an object of the invention to provide a device for more accurate determination of the displacement of a vehicle on wheels. To achieve this, a device in accordance with the invention is characterized in that it also comprises means for measuring a further quantity which is indicative of an instantaneous vertical velocity of the wheel relative to the body, and means for processing the measured further quantity so as to determine the displacement of the vehicle. Thus, the vertical component in the displacement of the reference point is eliminated. This results in more accurate determination of the displacement of the vehicle body. The foregoing is of importance inter alia for a navigation system determining the position of the vehicle by dead reckoning.

An embodiment of the device in accordance with the invention is characterized in that the means for measuring the further quantity comprise a pressure sensor which is coupled to a shock absorber or to a spring of the wheel suspension. The use of a pressure sensor offers an inexpensive and reliable implementation, the pressure sensor possibly being (partly) integrated in the wheel suspension, for example, in the shock absorber.

A further embodiment of the device in accordance with the invention is characterized in that the means for processing the measured further quantity comprises a correction filter, the filter parameters of which are adjustable in dependence on the type of wheel suspension of the vehicle. Undesirable components are thus eliminated from the measured signal, for example components caused by resonances which are specific to the wheel suspension of a given type of vehicle. The necessary parameters can be determined by calibration.

A further embodiment of the device in accordance with the invention is characterized in that the filter parameters vary as a function of the rotary velocity of the relevant wheel. When use is made of a variable filter, inaccuracies are corrected which stem from the fact that different disturbing factors occur at different vehicle speeds. The necessary parameters can be determined by calibration.

A further embodiment of the device in accordance with the invention is characterized in that the filter parameters vary as a function of the vehicle load. Using, for example, a look-up table stored in the processing means, inaccuracies due to different vehicle loads are counteracted. The necessary parameters can be determined by calibration.

A further embodiment of the device in accordance with the invention is characterized in that each of the wheels comprises respective means for measuring the further quantity, the means for processing the respective measured further quantities taking the mean value of the values determined on the basis of the respective measured further quantities in order to determine the displacement. This results in an even more accurate determination of the vehicle displacement.

The device can be advantageously used in a navigation system for determining the position of a vehicle by dead reckoning.

BRIEF DESCRIPTION OF THE DRAWING

These and other aspects of the invention will be described in detail with reference to a preferred embodiment, and in particular with reference to the appended drawing, in which.

DETAILED DESCRIPTION OF A PREFERRED EMBODIMENT

Figure 1A:
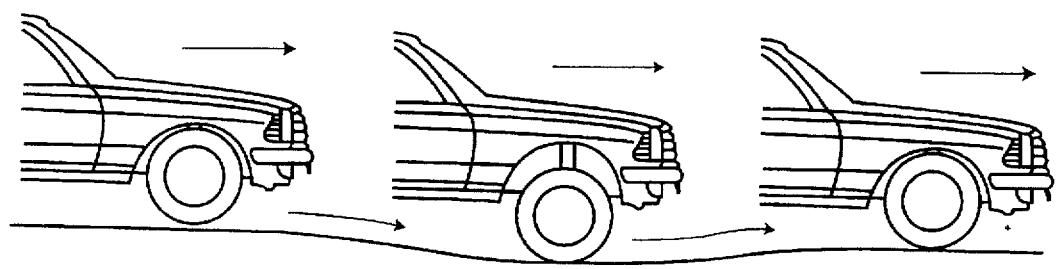
FIG. 1A illustrates how a vehicle follows a bumpy road surface.

FIG. 1A is a stylized representation of how a bump in a road is dealt with by a vehicle on wheels which are connected to its body by a wheel suspension. Due to the damping effect of the wheel suspension, via springs and/or shock absorbers, the displacement of the body is less than the apparent displacement of points on the circumference of the wheels because the wheels follow irregularities of the road surface much closer than the center of gravity of the body This applies both to pits and to bumps in the road surfaces. When the measured rotary velocity of one or more wheels is used to determine the displacement of the vehicle, therefore, a systematic error occurs: the apparent displacement of a reference point on the outer circumference of a wheel is greater than that of the body. As a result, it will appear as if geographic locations (for example, two cities) are situated further apart than they are in reality. In accordance with the invention, this systematic error is eliminated by introducing a correction in the determination of the body displacement by means of the rotary velocity of one or more wheels. The correction is based on the measurement of the instantaneous vertical velocity of these one or more wheels relative to the body.

Figure 1B:
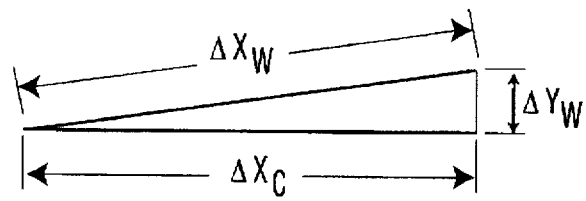
FIG. 1B shows the same as FIG. 1A but on an enlarged scale.

FIG. 1B shows the various displacement vectors on an enlarged scale. Herein, $X_W$ denotes the displacement of a reference point on the outer circumference of a wheel; $X_c$ denotes the vehicle displacement; $Y_W$ denotes the vertical displacement of the wheel relative to the body. During a small time interval $\Delta t$, the variation of these quantities mounts to $\Delta X_W$, $\Delta X_c$, $\Delta Y_W$, respectively, so that:

$$\left(\frac{\Delta X_c}{\Delta t}\right)^2 + \left(\frac{\Delta Y_w}{\Delta t}\right)^2 = \left(\frac{\Delta X_w}{\Delta t}\right)^2.$$

Thus, in the limiting, case for $\Delta t \to 0$:

$$X_c^2 + Y_w^2 = X_w^2$$

or $$\dot{X}_c = \sqrt{\dot{X}_w^2 - \dot{Y}_w^2}\ .$$

When $R_w$ is the rolling radius of a wheel and $\omega$ is the angular velocity of the wheel, it also holds that:

$$X_w = \int_t R_w \cdot \omega\, dt$$

so that for $X_c$ the following expression is derived:

$$X_c = \int_t \dot{X}_c\, dt = \int_t \sqrt{(R_w \cdot \omega)^2 - \dot{Y}_w^2}\, dt$$

$$= \int_t R_w \cdot \omega \cdot \sqrt{1 - \frac{\dot{Y}_w^2}{(R_w \cdot \omega)^2}}\, dt.$$

In a first approximation where the correction is relatively small, this may be written as $$\int_t \left(R \cdot w \cdot \omega - \frac{\dot{Y}_w^2}{2R_w \cdot \omega}\right) dt$$

When the vertical velocity of the wheel relative to the body, $\dot{Y}_w$, is known at any instant, the body displacement follows from the calculation of the above integral. Processing means, for example a microprocessor, calculate this integral on the basis of inputs $R_w$, $\omega$ and $\dot{Y}_w$.

The instantaneous value of $\omega$ is supplied by a sensor which measures the number of revolutions of the wheel per unit of time. The value of the rolling radius $R_w$ is substantially constant. Deformation of the tire by too high or too low pressure does not cause a substantial variation of the length of the running surface of the wheel. The instantaneous value of $\dot{Y}_w$ is supplied by a sensor, for example, a pressure sensor, a distance sensor, a speed sensor or an acceleration sensor, mounted on or in a shock absorber or a spring of the wheel suspension. Evidently, these sensors require calibration. For example, when use is made of a pressure sensor, first the pressure detected is by differentiation converted into the pressure variation with time. The latter quantity is then translated, for example using a look-up table stored in the processing means, into the associated vertical velocity of the wheel relative to the body.

It is to be noted that active shock absorbers comprising sensors are already commercially available, and that an ABS system also includes a sensor for measuring the number of revolutions of a wheel per unit of time. Therefore, in the case of a car equipped with ABS the invention can be simply implemented by utilizing a shock absorber including a pressure sensor and by adding a microprocessor for calculating the integral on the basis of the signals from the ABS system and the pressure sensor. Evidently, a plurality of sensors can also be used, for example one revolution counter for each wheel of the vehicle and one pressure sensor for each associated shock absorber. The microprocessor can then determine the integral for each wheel, and can subsequently take the mean value of the calculated integral values as the final value for the vehicle displacement.

Figure 2:
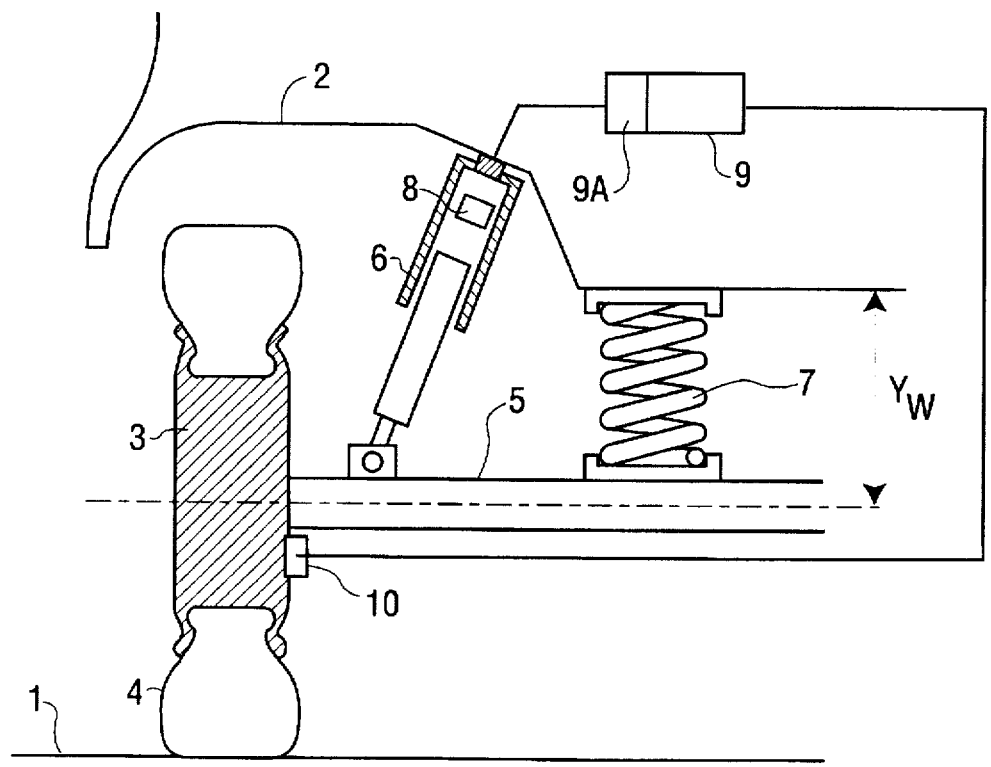
FIG. 2 shows a part of a vehicle provided with the device in accordance with the invention.

FIG. 2 shows a part of a vehicle comprising the device in accordance with the invention. The vehicle comprises a body 2, a wheel with a rim 3 and a tire 4 in contact with the road surface 1, an axle 5, a shock absorber 6, and a spring 7. In this Figure a pressure sensor 8 is mounted inside the shock absorber 6. Evidently, the sensor could also be coupled to the spring 7. Processing means 9, comprising a microprocessor, receive signals from the pressure sensor and from the wheel revolution counter 10. On the basis thereof the microprocessor calculates the integral which suitably approximates the vehicle displacement in accordance with the invention. By itself, the calculation of the integral is straightforward and the calculation has not been given in detail. As shown, the shock absorber is mounted at an acute angle with respect to the vertical axis of the car body. The vertical motion of the wheel then is found through an elementary trigonometric operation on the total velocity measured by the pressure sensor.

Preferably, the means for processing the measured further quantity comprise a correction filter 9A for eliminating undesirable, disturbing components in the signal measured by the pressure sensor. The filter parameters, in particular, as represented by the response curve of the filter versus frequency, can be adjustable. The adjustment may be made in dependence on the type of wheel suspension of the vehicle, type of tube used, and various others, when appropriate. The adjustment can be made statically, for example, upon periodic inspection or repair of the vehicle. Other types of adjustment can be dynamic, such as depending on the load of the vehicle. The latter adjustment is then made when the vehicle is at a standstill. For example, resonances which are specific to the wheel suspension of a given type of vehicle can be filtered out. The parameters required can be determined for each type of vehicle separately by calibration. In another embodiment, the filter parameters vary as a function of the angular velocity of the relevant wheel. When use is made of a variable filter, correction is possible for inaccuracies stemming from the fact that different disturbing factors occur at different vehicle speeds. For example, in the event of a high vehicle speed on an irregular road surface (for example, a gravel road) high-frequency components will arise in the signal from the pressure sensors, which components do not correspond to the actual displacement of the wheel. These high-frequency components can be filtered out by the variable correction filter. A given frequency in the signal from the pressure sensor, caused at a high speed by irregularities of the road surface which are large relative to the dimensions of a wheel, will occur at a lower speed in the event of road surface irregularities which are small relative to the wheel, for example pebbles. This is taken into account by the filter. Parameters for different speeds can be determined by calibration. In another embodiment, the filter parameters vary as a function of the vehicle load. Inaccuracies due to different loading of the vehicle are thus counteracted. Using, for example, a look-up table stored in the processing means, the filter parameters for each load can be stored. The required parameters can be determined by calibration at different vehicle loads.

The invention can be advantageously used in a navigation system for vehicles, for example, CARIN, which is described in an article by M. L. G. Thoone at pages 317–329 of the Philips Technical Review, Vol. 43, No. 11/12, December 1987, and hereby incorporated by reference. A navigation system of this kind comprises a storage medium, for example a CD-ROM, containing topographic and traffic information concerning the area in which the vehicle travels. A microcomputer determines dead reckoning coordinates for the actual position of the vehicle by means of distance and direction sensors. In accordance with the invention, the displacement, and hence the position of the vehicle at any instant, can thus be determined more accurately. The position of the vehicle can be even more accurately determined by comparison of the calculated dead reckoning coordinates with the data on the CD-ROM. Notably when the vehicle travels in an area not represented on the CD-ROM, it is important that the displacement is also known exactly because comparison with the stored data is then impossible. In that case the device in accordance with the invention can be particularly advantageously used.

Furthermore, the filter parameters of the correction filters can be adapted by means of a neural network which compares the displacement determined by the device with the displacement based on the data on the CD-ROM. The contents of the look-up table can thus be adapted so that the accuracy is further enhanced.

We claim:

1. A device for determining distance traveled by a vehicle comprising a body and wheels connected to said body by a suspension means, said device including:
   a. means for measuring a first quantity representative of rotary wheel velocity during an instant of time $\Delta t$;
   b. means for measuring a second quantity representative of substantially vertical wheel velocity relative to the vehicle body during the instant of time $\Delta t$; and
   c. processing means for processing a plurality of said first and second quantities to determine the distance travelled by the vehicle.

2. A device as in claim 1 where the means for measuring the second quantity comprises a pressure sensor.

3. A device as in claim 1 or 2 where the means for measuring the second quantity is at least partly integrated in the suspension means.

4. A device as in claim 1 or 2 where the processing means includes a correction filter having filter parameters that are adjustable in dependence on an operating characteristic of the suspension means.

5. A device as claimed in claim 1 where the processing means includes a correction filter having filter parameters that are adjustable as a function of the rotary wheel velocity.

6. A device as in claim 1 where the processing means includes a correction filter having filter parameters that are adjustable as a function of loading on the vehicle.

7. A device as in claim 1 or 2 where the vehicle comprises at least two wheels and respective ones of said means for measuring the first and second quantity at each of said two wheels, said processing means being adapted to determine mean values of the first quantities for each of said two wheels and to determine mean values of the second quantities for each of said two wheels thereby to determine the distance travelled by the vehicle.

8. A navigation system for a vehicle comprising a body and wheels connected to said body by a suspension means, said system comprising a device for determining distance traveled by the vehicle, said device including:
   a. means for measuring a first quantity representative of rotary wheel velocity during an instant of time $\Delta t$;
   b. means for measuring a second quantity representative of linear wheel velocity relative to the vehicle body during the instant of time $\Delta t$; and
   c. processing means for processing a plurality of said first and second quantities to determine the distance travelled by the vehicle.

9. A device for determining the distance travelled by a vehicle having wheels connected to a body of the vehicle via a suspension means, said device comprising:
   first means for measuring a first quantity representative of angular wheel velocity,
   second means for measuring a second quantity representative of an instantaneous vertical wheel velocity relative to the vehicle body, and
   means for processing a plurality of said first and second quantities and a quantity indicative of the wheel radius by calculating an integral of said quantities so as to determine the distance travelled by the vehicle.

10. The device as claimed in claim 9 wherein said processing means processes said second quantity relative to the first quantity so as to compensate an error in the calculated distance travelled by the vehicle that would otherwise occur due to said second quantity.

11. The device as claimed in claim 9 wherein said first measuring means is coupled to at least one vehicle wheel and the second measuring means is coupled to said suspension means.

12. The device as claimed in claim 11 wherein said suspension means comprises one of a shock absorber and a suspension spring of the vehicle.

13. The device as claimed in claim 9 wherein the processing means includes a correction filter having filter parameters that are variable as a function of a parameter associated with the vehicle.

14. A device for determining the distance traveled along a surface by a vehicle that is mounted on suspended wheels by wheel suspension means, said device comprising:
   at least one first sensor for measuring a first quantity that is indicative of a rotary velocity of a wheel of the vehicle,
   at least one second wheel-mounted sensor for measuring a further quantity that is indicative of instantaneous irregularities of the surface and which is arranged to measure an instantaneous vertical velocity of the associated wheel relative to the body via connection to a shock absorber or to a spring of said suspension means, and
   processing means for processing the first and second quantities so as to determining the distance traveled, wherein said processing means comprise a correction filter with filter parameters that are non-uniformly dependent upon one or more static or dynamic parameters pertaining to the vehicle.

15. The device as claimed in claim 14 wherein said parameters include at least one of the following, the type of wheel suspension of the vehicle, the actual angular velocity of the wheel in question, and the vehicle load.

16. The device as claimed in claims 14 or 15, wherein the vehicle comprises at least two wheels each provided with a respective said second sensor, and said processing means provides an averaging of result quantities derived from respective said second sensors.

17. A device as claimed in claim 1, wherein said processing means processes said plurality of first and second quantities independently of the vertical acceleration of the vehicle wheels.

* * * * *